(12) United States Patent
Arrobo et al.

(10) Patent No.: US 9,020,059 B1
(45) Date of Patent: Apr. 28, 2015

(54) SYSTEM AND METHOD FOR DIVERSITY CODED ORTHOGONAL FREQUENCY DIVISION MULTIPLEXING (OFDM)

(71) Applicants: Gabriel E. Arrobo, Tampa, FL (US); Richard D. Gitlin, Tampa, FL (US)

(72) Inventors: Gabriel E. Arrobo, Tampa, FL (US); Richard D. Gitlin, Tampa, FL (US)

(73) Assignee: University of South Florida, Tampa, FL (US)

(*) Notice: Subject to any disclaimer, the term of this patent is extended or adjusted under 35 U.S.C. 154(b) by 0 days.

(21) Appl. No.: 14/098,173

(22) Filed: Dec. 5, 2013

Related U.S. Application Data

(60) Provisional application No. 61/733,662, filed on Dec. 5, 2012.

(51) Int. Cl.
*H04L 1/02* (2006.01)
*H04L 27/26* (2006.01)

(52) U.S. Cl.
CPC .............. *H04L 1/02* (2013.01); *H04L 27/2601* (2013.01)

(58) Field of Classification Search
CPC ..... H04L 1/0631; H04L 1/02; H04L 27/2601; H04L 1/0625; H03M 13/00
USPC .......... 375/295, 316, 259; 714/799, 800, 699
See application file for complete search history.

(56) References Cited

U.S. PATENT DOCUMENTS

| | | | |
|---|---|---|---|
| 5,007,067 A | | 4/1991 | Ayanoglu et al. |
| 5,365,525 A | * | 11/1994 | Newberg et al. ............... 714/701 |
| 2003/0084400 A1 | * | 5/2003 | Kaku et al. ..................... 714/800 |

* cited by examiner

*Primary Examiner* — Vineeta Panwalkar
(74) *Attorney, Agent, or Firm* — Molly L. Sauter; Smith & Hopen, P.A.

(57) ABSTRACT

The present invention provides a Diversity Coding—Orthogonal Frequency Division Multiplexing (DC-OFDM) system and method that applies diversity coding to OFDM-based systems and provides improved probability of successful reception at the receiver and transparent self-healing and fault-tolerance. Diversity coding is well suited for OFDM-based systems because of its spatial diversity nature (parallel links). DC-OFDM provides the best performance when the probability of link error is high or when a link (sub-channel) fails. Also, by implementing diversity coding in OFDM-based systems, a reliable communication can be provided that is quite tolerant of link failures, since data and protection lines are transmitted via multiple sub-channels.

19 Claims, 8 Drawing Sheets

SYSTEM AND METHOD FOR DIVERSITY CODED ORTHOGONAL FREQUENCY DIVISION MULTIPLEXING (OFDM)

CROSS-REFERENCE TO RELATED APPLICATIONS

This application claims prior to U.S. Provisional Patent Application No. 61/733,662 filed on Dec. 5, 2012, entitled "System And Method For Diversity Coded Orthogonal Frequency Division Multiplexing (OFDM)", which in herein incorporated by reference in its entirety.

STATEMENT OF GOVERNMENT INTEREST

This invention was made with Government support under IIP-1217306 awarded by the National Science Foundation. The Government has certain rights in the invention.

BACKGROUND OF THE INVENTION

Orthogonal Frequency Division Multiplexing (OFDM) is a widely used technology in fourth generation wireless networks (4G), 802.11a/g/n WLANs and other communication systems that achieve high transmission rates over dispersive channels by transmitting serial information through multiple parallel carriers. In OFDM, the transmission bandwidth is divided into many narrow sub-channels, which are transmitted in parallel, such that the fading experienced by each channel is flat.

Many applications require that information be communicated in a timely manner, so reliability of these networks is of concern. Various techniques are known in the art for improving transmission reliability and speed. Network coding techniques for OFDM are known in the art, wherein packets are combined and transmitted through different nodes or locations to improve the reliability of the channel. These network coding techniques may be employed at the symbol level or the packet level and may include network coding in the MAC (media access control) layer and network coding in the PHY (physical) layer. Additional techniques may include rate diverse network coding, zero cost retransmission and Code-Play.

The prior art methods utilizing network coding are typically applied to two-hop communication systems through a relay and to multicast systems, where it has been proven that network coding provides throughput gain. However, these network coding techniques for OFDM require rerouting of lost data or require a feedback channel from the transmitter to recover lost information.

Accordingly, what is needed in the art is an OFDM based system having improved spectral efficiency, excellent transmission rates, improved throughput, improved performance during multipath fading and the ability to easily retrieve lost information without the need for retransmission or feedback from the transmitter.

SUMMARY

In view of the limitations of the prior art, a novel idea employing diversity coding across OFDM subchannels is proposed to improve spectral efficiency, transmission rate, throughput and performance during multipath fading, without requiring rerouting or retransmission of lost information.

In accordance with the present invention, diversity coding is a feed-forward spatial diversity technology that enables near instant self-healing and fault-tolerance in the presence of wireless link failures. In diversity coding, the protection paths ($c_i$) carry information that is the combination of the uncoded data lines ($d_i$).

In one embodiment, the present invention provides a method for recovering lost data symbols in an orthogonal frequency division multiplexing (OFDM) system. The method includes, generating one or more uncoded data symbols and generating one or more diversity coded data symbols, the one or more diversity coded data symbols comprising a combination of the one or more uncoded data symbols. The method further includes, transmitting, by a transmitter, each of the one or more uncoded data symbols on one of a plurality of data subcarriers of the OFDM system and transmitting, by the transmitter, each of the one or more diversity coded data symbols on one of a plurality of protection subcarriers of the OFDM system. The method further includes, receiving, by the receiver, the one or more diversity coded data symbols and when one or more of the uncoded data symbols is lost during transmission, recovering the one or more lost uncoded data symbols using the one or more diversity coded data symbols.

In an additional embodiment, the present invention provides a system for recovering data in an orthogonal frequency division multiplexing (OFDM) system. The system include, a transmitter configured for generating one or more uncoded data symbols, for generating one or more diversity coded data symbols, the one or more diversity coded data symbols comprising a combination of the one or more uncoded data symbols, for transmitting each of the one or more uncoded data symbols on one of a plurality of data subcarriers of the OFDM system and for transmitting each of the one or more diversity coded data symbols on one of a plurality of protection subcarriers of the OFDM system. The system further includes a receiver configured for receiving the one or more diversity coded data symbols and for recovering the lost uncoded data symbols using the one or more diversity coded data symbols when one or more of the uncoded data symbols is lost during transmission.

BRIEF DESCRIPTION OF THE DRAWINGS

For a fuller understanding of the invention, reference should be made to the following detailed description, taken in connection with the accompanying drawings, in which.

DETAILED DESCRIPTION

The diversity coded OFDM system and method of the present invention increases the reliability of point-to-point OFDM wireless connections by transmitting data in a set of subcarriers and transmitting protection data (redundant, or coded, information) in a another subset of subcarriers. Diversity coded OFDM is based on the observation that in OFDM communications the information is transmitted through orthogonal frequencies (parallel channels/links) and each subchannel can experience different channel effects. The diversity coded OFDM technique of the present invention for applying coding across OFDM carriers differs from the traditional coded OFDM where channel coding techniques, such as convolutional codes, Reed-Solomon codes, in combination with interleaving, are applied to the serial data stream in the time domain prior to mapping into subcarrier channels.

Figure 1A:
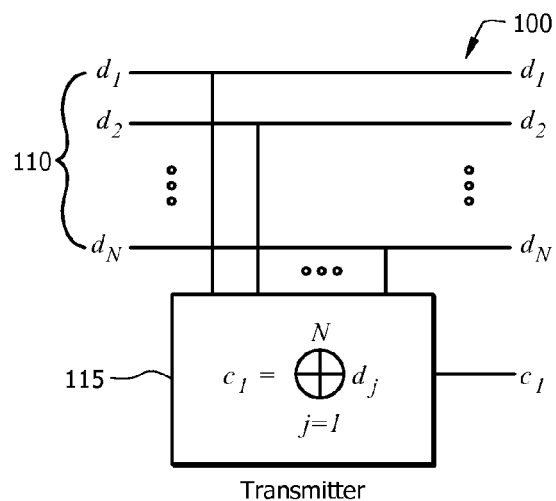
FIG. 1A is a diagram illustrating a 1-for-N diversity coded transmitter in accordance with an embodiment of the present invention.
Figure 1B:
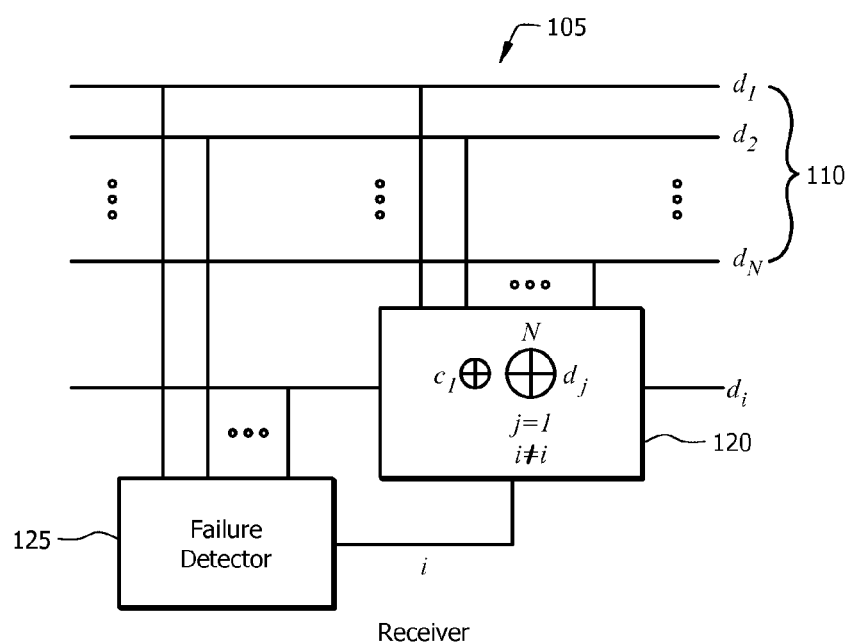
FIG. 1B is a diagram illustrating a 1-for-N diversity coded receiver in accordance with an embodiment of the present invention.

With reference to FIG. 1A and FIG. 1B, the present invention includes a system for recovering data in an orthogonal frequency division multiplexing (OFDM) system that comprises a transmitter 100 configured for generating one or more uncoded data symbols 110, for generating one or more diversity coded data symbols 115, the one or more diversity coded data symbols comprising a combination of the one or more uncoded data symbols. The transmitter 100 is further configured for transmitting each of the one or more uncoded data symbols 110 on one of a plurality of data subcarriers of the OFDM system and for transmitting each of the one or more diversity coded data symbols 115 on one of a plurality of protection subcarriers of the OFDM system. The system further includes a receiver 105 configured for receiving the one or more diversity coded data symbols 115 and for recovering the lost uncoded data symbols 120 using the one or more diversity coded data symbols 115 when one or more of the uncoded data symbols 110 is lost during transmission.

In an additional embodiment, the transmitter and the receiver may be integrated into a single transceiver that provides both transmission and reception of wireless signals.

The receiver includes a failure detector 125 to detect one or more encoded data symbols lost during transmission.

The diversity coding system in accordance with the present invention uses a spatial parity check code for a point-to-point system with N data lines 110 and 1 protection line 115. If any of the data lines fail (e.g. $d_3$), utilizing the protection line ($c_1$), the destination (receiver 105) can recover the information of the data line that was lost ($d_3$) by taking the mod 2 sum of all of the received signals. As such, by using just one extra line, the lost information in the failed link can be recovered instantaneously without rerouting or providing a feedback channel to the transmitter.

The diversity coding of the present invention can be extended to multiple line failures (M-for N Diversity Coding systems). A network is transparently self-healed when any combination of N coded links survive among M diverse links. In the present invention, an OFDM-based system is enhanced with diversity coding by allowing some subcarriers to transport the data and other subcarriers (a few) to transport the protection information to be used to recover the data in the case of a link (subcarrier) failures.

Figure 2A:
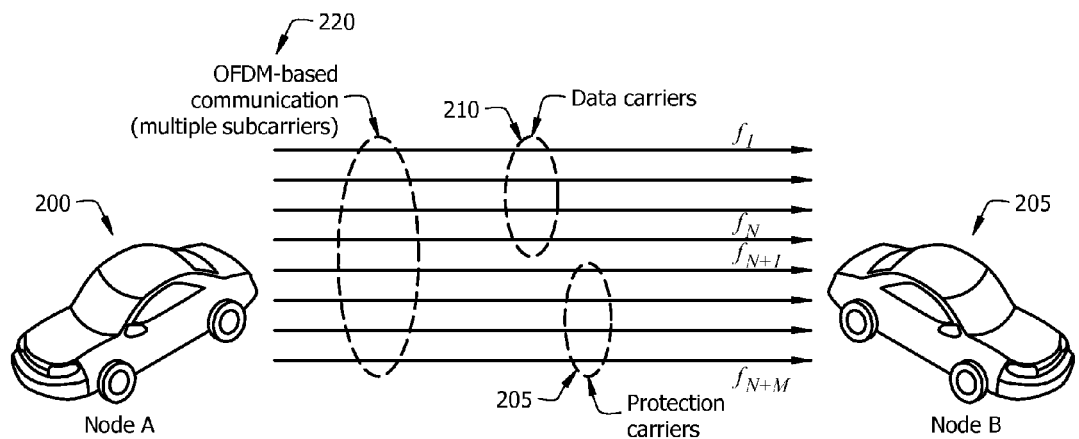
FIG. 2A is a diagrammatic illustration of a diversity coded vehicular OFDM communication system in accordance with an embodiment of the present invention.

An exemplary vehicular diversity coded OFDM communication system in accordance with the present invention is shown with reference to FIG. 2A. Wireless Access in Vehicular Environments (WAVE) is a wireless scheme that provides vehicle-to-vehicle communication and vehicle-to-infrastructure communication and is primarily used in providing emergency safety measures for vehicles 200, 205. In a particular embodiment, diversity coded OFDM may be employed in a Vehicular Ad Hoc Network (VANET) to improve the throughput and the expected number of correctly received symbols. Applying diversity coding to OFDM-based communications promises high reliability in vehicular, and other, communications while preserving high transmission rates. This is achieved by transmitting coded information across the OFDM carriers 220. That is, most of the data carriers 210 transport original uncoded information while the remaining (few) carriers 205 transport coded protection information. The coded information is the result of the combination of the original information.

Figure 2B:
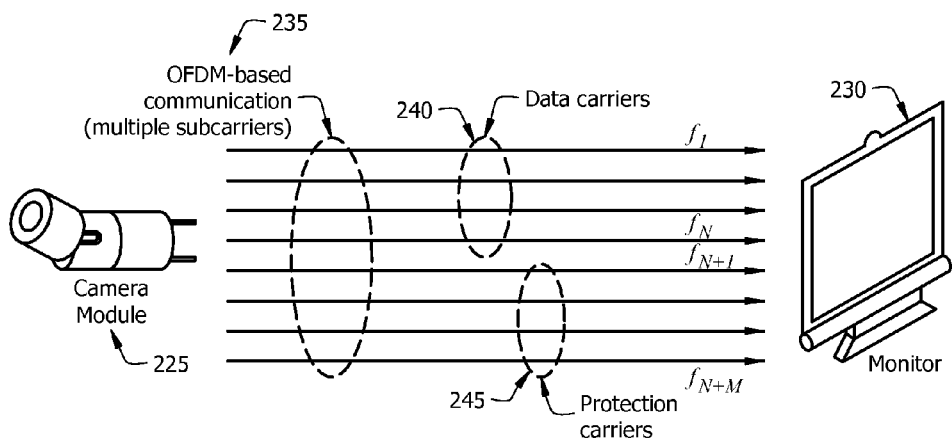
FIG. 2B is a diagrammatic illustration of a diversity coded in vivo OFDM communication system in accordance with an embodiment of the present invention.

An exemplary medical device diversity coded OFDM communication system in accordance with the present invention is shown with reference to FIG. 2B. In a Wireless Body Area Network (WBAN) channel model involves communicating information across the boundary of the body (i.e. between in vivo and on-body or other external devices). Naturally, such communication poses significant difficulties. First, for radio frequency (RF) communication, the body is relatively lossy, making the establishment of links with high signal-to-noise ratio (SNR) and therefore high data rates challenging. Second, because the dielectric parameters of internal tissues depend on the operating frequency and a typical end-to-end propagation path consists of multiple components associated with many types of tissues, it can be difficult to couple electromagnetic fields efficiently into or out of the body. There are key technical challenges to the efficient use of the in vivo RF spectrum for access to embedded medical devices, especially for real-time traffic, such as video streaming applications, which require high transmission data rates. In the embodiment shown in FIG. 2B, a camera module 225, which may be embedded in an abdominal cavity, provides real-time video to a monitor 230 utilizing an OFDM system employing diversity coding across a plurality of subcarriers 235, as taught by the present invention. To provide a high data transmission rate, while maintaining adequate reliability levels, most of the data carriers 240 transport original uncoded information while the remaining (few) carriers 245 transport coded protection information. The coded information is the result of the combination of the original information.

Figure 3:
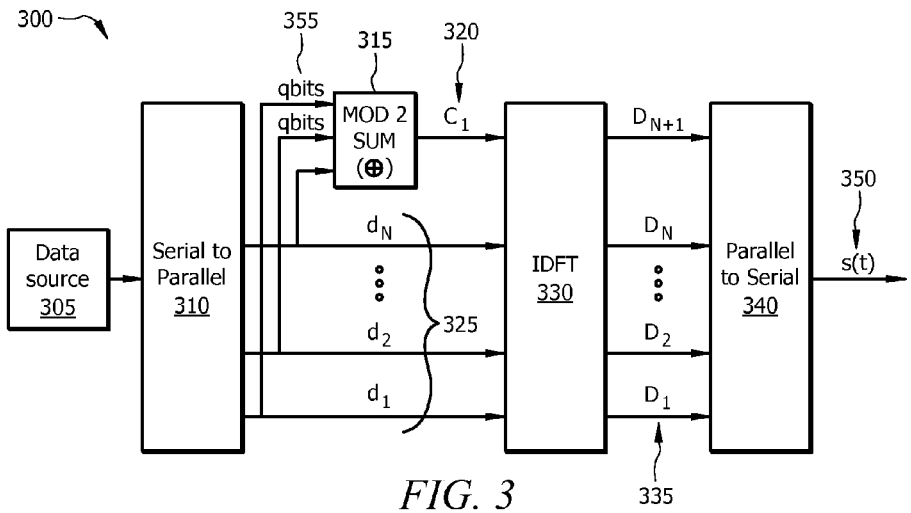
FIG. 3 is a diagram illustrating a 1-for-N diversity coded OFDM communication links transmitter in accordance with the present invention.

With reference to FIG. 3, a transmitter 300 is accordance with present invention receives data from a data source 305. The serial to parallel processor 310 of the transmitter provides the received serial data to a plurality of parallel data carriers. The data carriers ($d_1$, $d_2$, up to $d_N$) 325 provide the uncoded data and the protection carrier (c1) 320 provides the diversity coded data. The diversity coded data 300 is generated by a mod 2 sum module 315. The uncoded data and the diversity coded data are then processed through an Inverse Discrete Fourier Transform module (IDFT) 330 to generate the time-domain symbols 335. The time-domain symbols 335 are then processed by a parallel to serial processor 340 to generate the wireless signal to be transmitted, s(t) 350. If any of the carriers that transport data ($d_1, d_2$, up to $d_N$) is lost because of a fade or the performance of any carrier is poor, the information from the lost carrier can be recovered from the (received) protection carriers ($c_1$ for this simple example).

The information transported by the protection subcarrier $c_1$, as shown in FIG. 3, is calculated as:

$$c_1 = \bigoplus_{j=1}^{N} d_j \qquad (1)$$

At the receiver, the decoding process is carried out using:

$$\hat{d}_i = \bigoplus_{j=1}^{N} d_j \oplus \bigoplus_{\substack{j=1 \\ j \neq i}}^{N} d_j \qquad (2)$$

Expanding Eq. (2), gives:

$$\hat{d}_i = (d_1 \oplus \ldots \oplus d_i \oplus \ldots \oplus d_N) \oplus (d_1 \oplus \ldots \oplus d_{i-1} \oplus d_{i+1} \oplus \ldots \oplus d_N) \qquad (3)$$

Given that $d_j \oplus d_j = 0$, Eq. (3) becomes:

$$\hat{d}_i = d_i \qquad (4)$$

If there is no failure in the data lines (data subcarriers), the information transmitted through the protection subcarrier is discarded. However, if there is a link failure in any of the data subcarriers, a failure detection algorithm detects the failure and informs the receiver which data subcarrier should be omitted and the information of the data subcarrier with failure is recovered with the information provided by the protection subcarrier. That is, if the information of the data subcarrier $d_i$ is lost or corrupted, it can be recovered using $c_1$.

Figure 4:
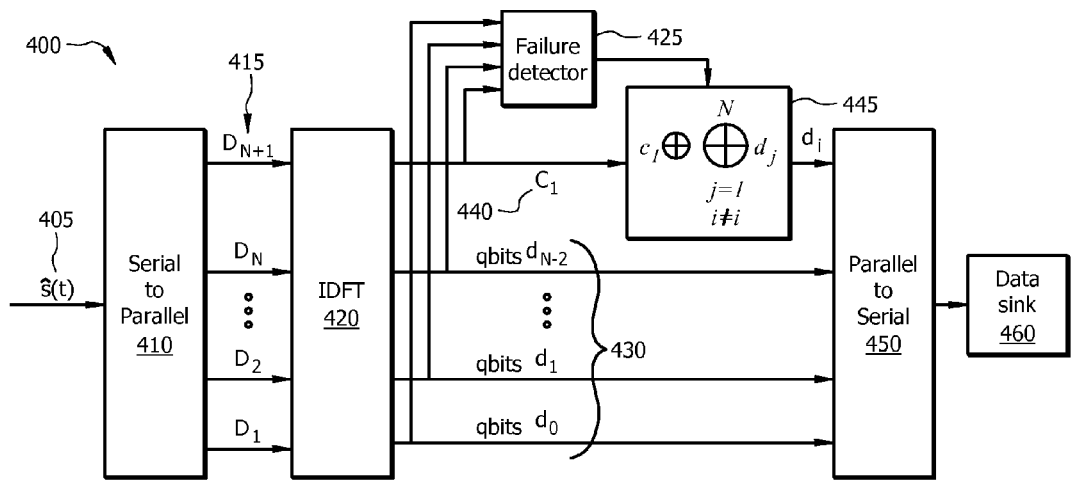
FIG. 4 is a diagram illustrating a 1-for-N diversity coded OFDM communication links receiver in accordance with the present invention.

As shown in FIG. 4, a receiver 400 receives the signal 405 transmitted from the transmitter 300. During the transmission process, some of the subchannels carrying the signals may have been negatively affected by noise in the channel. The transmitted data 405 is received at the serial to parallel processor 410 of the receiver, serial data 415 is converted to multiple parallel symbols. The parallel symbols 415 are then processed by an Inverse Discrete Fourier Transform (IDFT) module 420 to generate the frequency domain symbols. A failure detector 425 is then used to detect if one or more of the carriers have been lost during the transmission. To detect which subchannels (carriers) are in error, the failure detector 425 can check the eye diagram of each subcarrier 430 and discard the carriers that shows more dispersion in the eye diagram. Another technique that the receiver can employ to verify which carriers are in error is by using a line code by checking violations in the line code. If a failure is detected in one of the subcarriers 430, the diversity coded symbol of the protection carrier 440 can be used to perform a logical XOR operation 445 to recover the lost symbols. The recovered data is then processed by a parallel to serial processor 450 and subsequently transmitted to the data sink 460 coupled to the receiver 400.

As shown in FIG. 3 and Eq. (1), each link can carry as few as one bit to implement a 1 for N diversity coding system, because with one bit a Galois Field can be calculated of up to two elements $\{0, 1\}$, $GF(2^1)$. In other words, the number of protection links is limited by the number of bits per link. That is, the larger the number of bits to be transmitted by each link, the larger the number of protection links that can be implemented. This is because the number of protection links (subcarriers) is limited to the Galois Field [$GF(2^q)$] size q to calculate the information that is transmitted through the protection links.

Diversity coding, which is a spatial feed-forward error correction technique, is well suited to work on OFDM-based systems because the protection "lines" can be transmitted through some of the subcarriers. Since the number of protection subcarriers depends on the Galois Field size q, q bits per subcarrier are first assigned in the serial to parallel conversion 355, as shown in FIG. 3.

The number of bits to be transmitted per subcarrier is calculated based on the number of data and protection subcarriers, N and M, respectively and is given by [2]:

$$q \geq \lceil \log_2(N+M+1) \rceil \qquad (5)$$

The total number of data plus protection lines (subcarriers) should be at most equal to the FFT size because the number of subcarriers is limited to the FFT size:

$$N + M \leq FFT_{size} \qquad (6)$$

The protection information that is transmitted through some of the OFDM subcarriers is calculated as:

$$c_i = \sum_{j=1}^{N} \beta_{ij} d_j \quad i \in \{1, 2, \ldots, M\} \qquad (7)$$

$$i \in \{1, 2, \ldots, M\} \qquad (7)$$

In formulating diversity coding OFDM the Vandermonde matrix approach may be followed to create the coded symbols (i.e., the protection information), which are linearly independent of each other, and each coded symbol ($c_i$) has the information of all the data symbols ($d_j$). In an additional embodiment, Hamming codes could also have been followed, or other codes where each coded symbol (parity bits) has the information of only some data bits in different combinations. However, in this case, the receiver would need additional processing.

Figure 5:
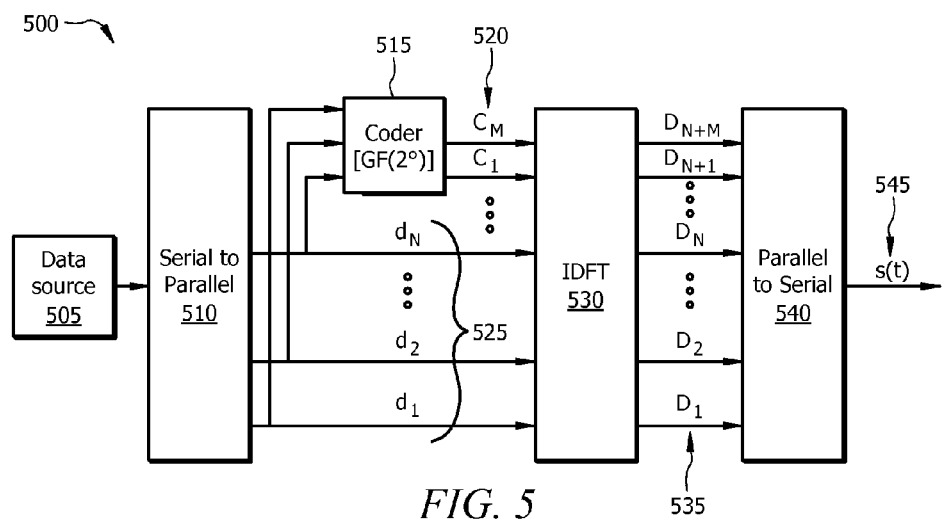
FIG. 5 is a diagram illustrating an M-for-N diversity coded OFDM communication links transmitter in accordance with the present invention.

FIG. 5 shows an M for N diversity coding OFDM at the source node, where each subcarrier carriers a symbol (Galois Field element) of q bits. With reference to FIG. 5, a transmitter 500 is accordance with present invention receives data from a data source 505. The serial to parallel processor 510 of the transmitter provides the received serial data to a plurality of parallel data carriers. The data carriers ($d_1, d_2$, up to $d_N$) 525 provide the uncoded data and the protection carriers ($c_M$ up to $c_1$) 520 provides the diversity coded data. The diversity coded data 520 is generated by a [$GF(2^q)$] coder 515. The uncoded data and the diversity coded data are then processed through an Inverse Discrete Fourier Transform module (IDFT) 530 to generate the time-domain symbols 535. The time-domain symbols 535 are then processed by a parallel to serial processor 540 to generate the wireless signal to be transmitted, s(t) 545. Moreover, the information transmitted through each subcarrier (data or protection subcarrier) is predetermined and known by the transmitter and receiver. That is, the subcarrier index (location) is predefined for each subcarrier to transport either data or protection information.

Since the information transmitted through the data lines (subcarriers) is uncoded, the coding coefficients of the data lines form an identity matrix of size n ($I_N$) as shown below:

$$\text{Subcarrier}_j \left\{ \begin{bmatrix} \overbrace{\begin{matrix} 1 & 0 & 0 & \ldots & 0 \\ 0 & 1 & 0 & \ldots & 0 \\ \vdots & \vdots & \vdots & \ddots & \vdots \\ 0 & 0 & 0 & \ldots & 1 \end{matrix}}^{\text{Data line}_j} \end{bmatrix} \right. \quad (8)$$

where $j \in \{1, 2, \ldots, N\}$. The coefficients of the protection lines are formed by the $\beta_{ij}$ coefficients matrix, as shown below:

$$\text{Subcarrier}_{i+N} \left\{ \begin{bmatrix} \overbrace{\begin{matrix} 1 & 1 & \ldots & 1 \\ 1 & \alpha^2 & \ldots & \alpha^{2N} \\ 1 & \vdots & \ddots & \vdots \\ 1 & \alpha^{(M-1)} & \ldots & \alpha^{(M-1)N} \end{matrix}}^{\text{Protection line}_{i+N}} \end{bmatrix} \right. \quad (9)$$

The assignment of the data and protection lines to each subcarrier is predefined to minimize the computational complexity in both transmitter and receiver. The assignment can be sequential, where the data lines $\{1, 2, \ldots, N\}$ can be assigned to the N first subcarriers and the protection lines $\{1, 2, \ldots, M\}$ can be assigned to the next M subcarriers $\{N+1, N+2, \ldots, N+M\}$, or it can be interleaved, where for example, the first data line is assigned to the first subcarrier, the first protection line is assigned to the second subcarrier, the second data line is assigned to the third subcarrier, and so on. This will depend on the diversity code (DC) rate. We define the DC code rate as the ratio of the number of data lines (subcarriers) to the number of data plus protection lines (subcarriers) ratio:

$$DC \text{ code rate} = N/N + M \quad (10)$$

At the receiver, the coefficients of the data and protection lines form the following matrix, which depends on the information that was correctly received at the destination:

$$\beta' = \begin{bmatrix} 1 & 0 & 0 & \ldots & 0 \\ 0 & 1 & 0 & \ldots & 0 \\ \vdots & \vdots & \vdots & \ddots & \vdots \\ 0 & 0 & 0 & \ldots & 1 \\ 1 & 1 & 1 & \ldots & 1 \\ 1 & \alpha & \alpha^2 & \ldots & \alpha^N \\ \vdots & \vdots & \vdots & \ddots & \vdots \\ 1 & \alpha^{(M-1)} & \alpha^{(M-1)2} & \ldots & \alpha^{(M-1)N} \end{bmatrix} \quad (11)$$

The receiver, by using the $\beta'$ matrix coefficients, a (N+M)-by-N matrix, can find the transmitted data by recovering the lost information in the data lines through the protection lines. That is, the receiver uses only N rows out of the N+M rows from the $\beta'_N$ matrix coefficients to recover the information of the data lines:

$$\beta'_N x = b_N \quad (12)$$

The receiver preferably uses as many indexes of the data lines as possible to faster decode the information that is lost during transmission. In other words, the receiver uses as many elements of the identity matrix, Eq. (8), as the implementation will allow. If no data line is lost during transmission, no decoding process is needed at the receiver and the information transmitted through the protection lines is discarded. The vector formed by the data lines x is:

$$x = \begin{bmatrix} d_1 \\ d_2 \\ \vdots \\ d_N \end{bmatrix} \quad (13)$$

and $b_N$ is the vector formed by the correctly received information at the destination with the same indexes as the $\beta'_N$ matrix.

The receiver can recover the lost information transmitted through the data lines by performing Gaussian elimination of the $\beta$ coefficients (protection lines). This is a fast process because some of the row elements of the coefficients matrix are already in the row canonical form.

The performance of the diversity coded OFDM of the present invention is measured by the probability of successful reception at the destination. The effect of different parameters, such as: number of data links, number of coded (protection) links, modulation technique and DC code rate to optimize the communication's probability of successful reception of an OFDM at the receiver have been analyzed. Moreover, the diversity coded OFDM as compared to existing OFDM-based systems such as IEEE 802.11p, that do not use coding in the spatial domain (across sub-channels) has been analyzed. The results of these analyses are illustrated in FIG. 6-FIG. 10.

Figure 6:
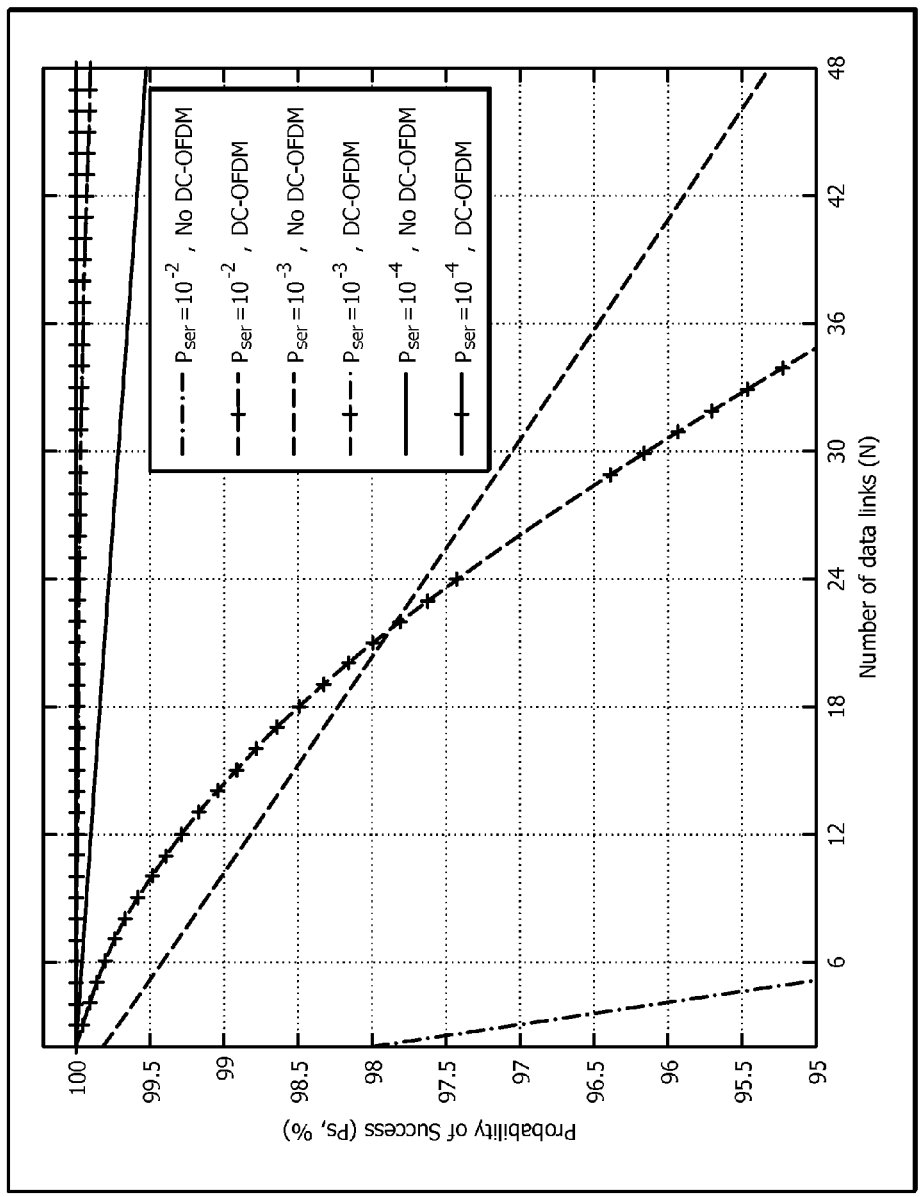
FIG. 6 is a graphical illustration of the performance of a 1-for-N diversity coded OFDM system as a function of the number of subcarriers.
Figure 7:
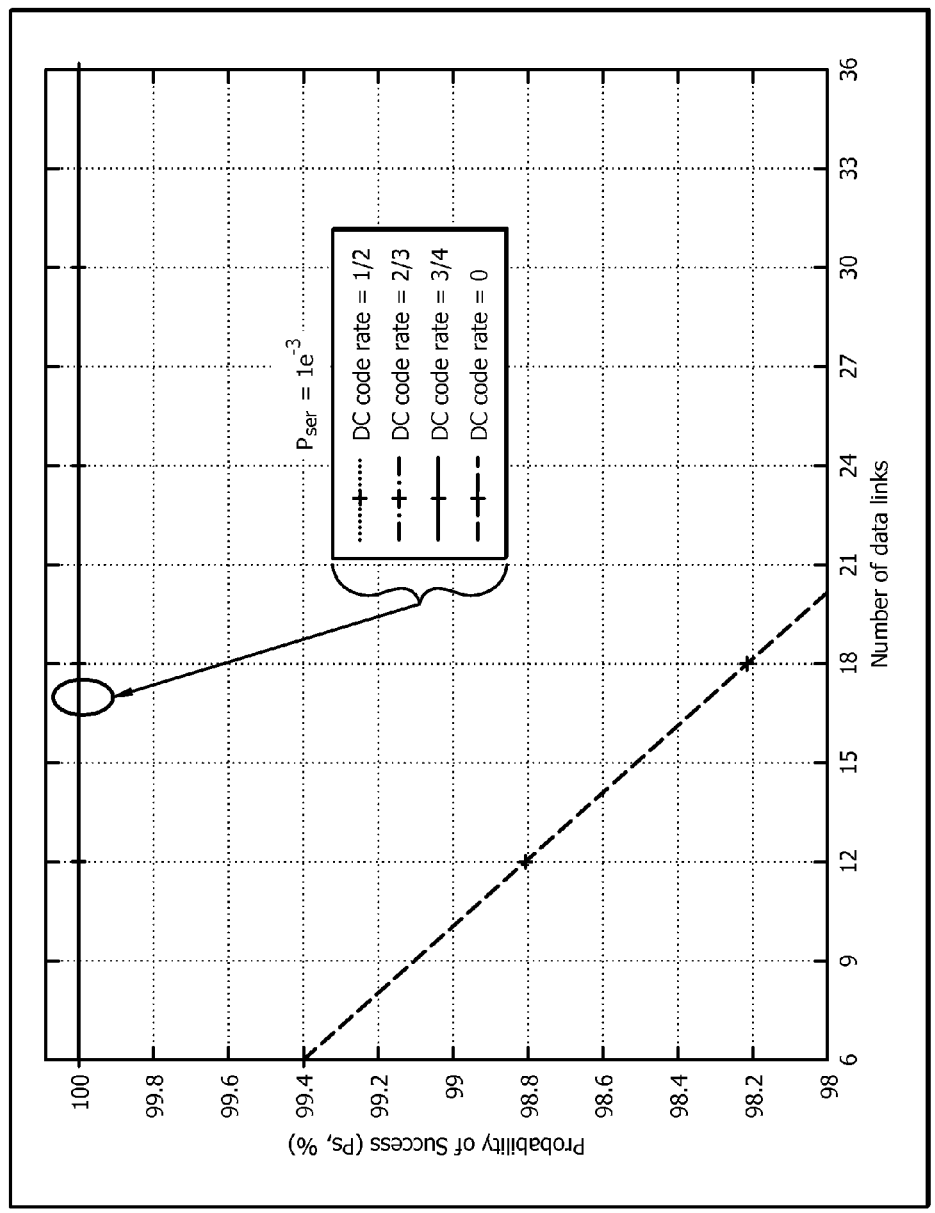
FIG. 7 is a graphical illustration of the performance of an M-for-N diversity coded OFDM system for a probability of link error $p_{ser}$ of $10^{-3}$.

With reference to FIG. 6, the performance of a 1-for-N diversity coded OFDM system is compared to extant OFDM systems that do not use diversity coding. FIG. 7 shows the probability of successfully receiving at the destination the information as a function of the number of data links (subcarriers) for different symbol error rates per subcarrier. As shown in FIG. 6, by only adding one subcarrier to transmit coded information, that is the combination of the information transmitted through the data links, a significant performance improvement (probability of correctly receiving the information) can be achieved as the number of data links increases. The performance improvement is more pronounced for high symbol error rates. As noted above, diversity coding provides excellent performance when a subchannel is not capable of reliable communications.

Figure 8:
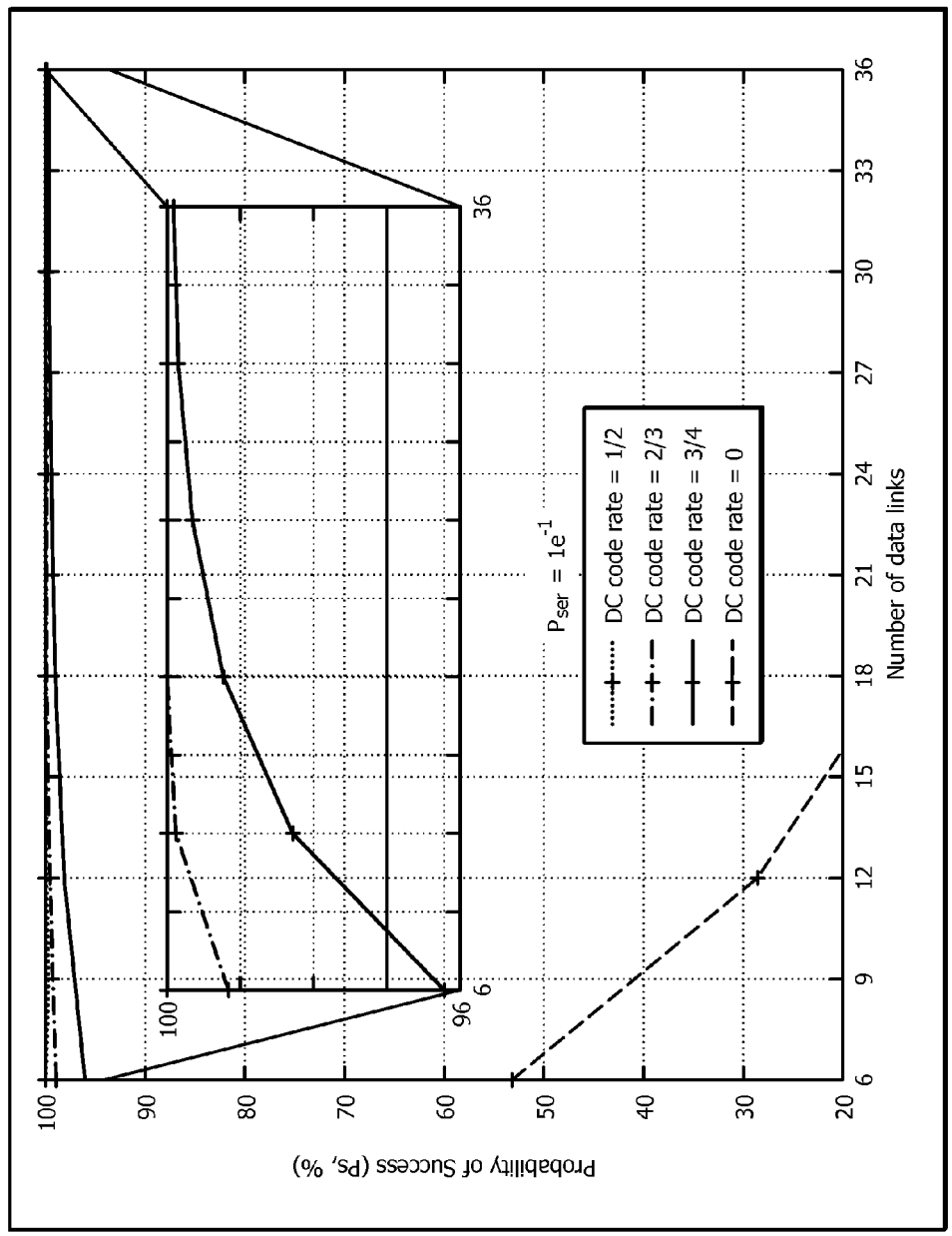
FIG. 8 is a graphical illustration of the performance of an M-for-N diversity coded OFDM system for a probability of link error $p_{ser}$ of $10^{-1}$.

FIG. 7 and FIG. 8 show the performance of the diversity coded OFDM as a function of the number of data links for different, typical, code rates. As seen in FIG. 7, ½, ⅔ and ¾ code rates achieve the maximum throughput performance because the symbol error probability is very small. For higher symbol error probabilities, as shown in FIG. 8, DC code rate of ½ provides the highest probability of successful reception at the receiver. That is, the probability of correctly receiving the information through at least N data and/or protection lines (subcarriers). For typical symbol error probabilities, low DC code rates are enough to achieve the best performance. Seen from another viewpoint, the energy per symbol (or energy per bit, $E_b/N_0$) can be reduced and the DC code rate can be increased to achieve a 100% of probability of successful reception. Additionally, note that without diversity coding, as the number of data links (subcarriers) increases, the probability of correctly received information of all the data links decrease exponentially.

Figure 9:
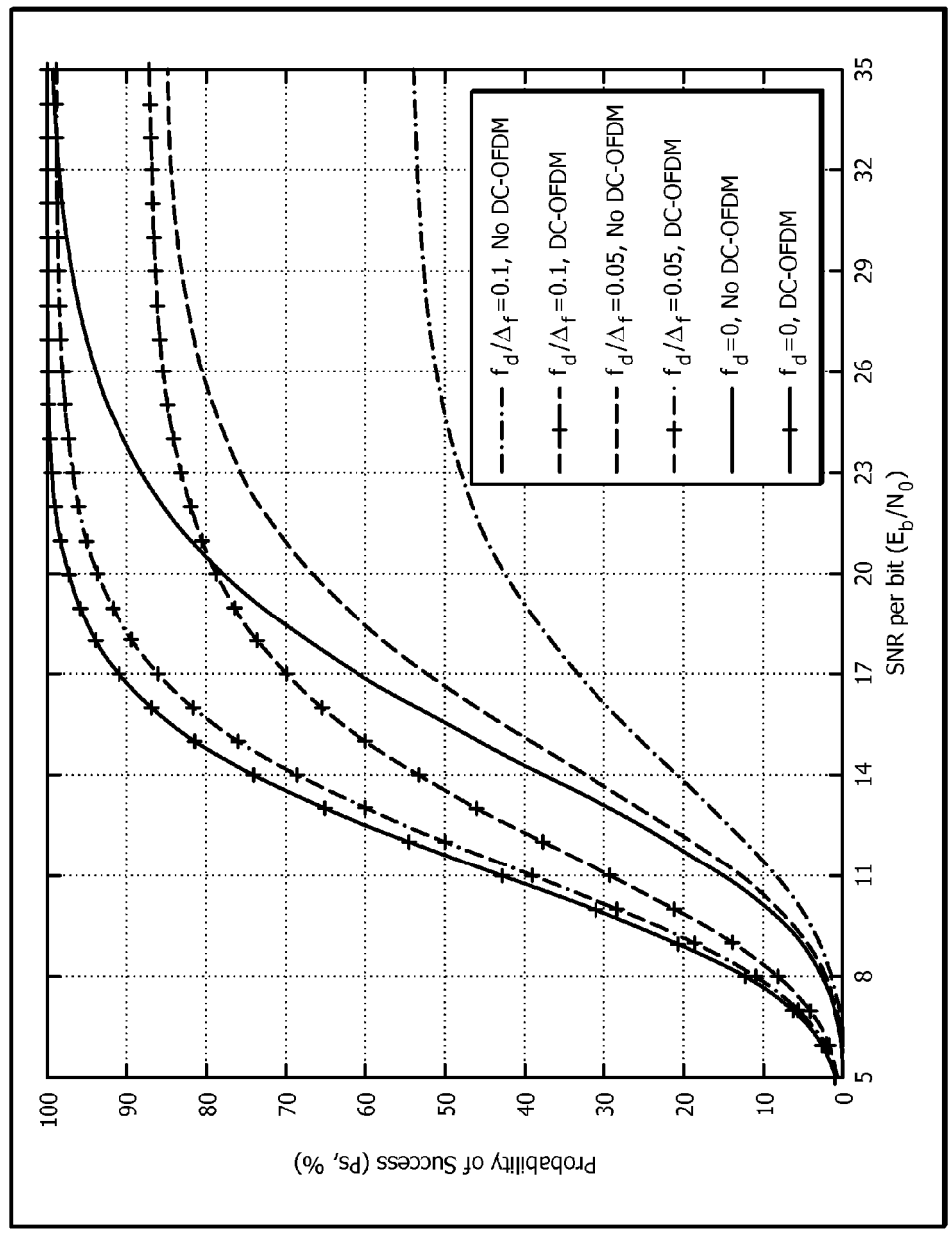
FIG. 9 is a graphical illustration of the performance of a 1-for-N diversity coded OFDM-QPSK system in a multi-path channel for various relative speeds.

The performance of a 1-for-N diversity coded OFDM system for OFDM-QPSK modulated in a multi-path channel for various relative speeds between transmitter and receiver vehicles (expressed as the maximum Doppler shift ($f_d$) and the subcarrier spacing $\Delta f$ ratio) is shown in FIG. 9. As can be seen, diversity coded OFDM provides performance improvement for communications between stationary vehicles ($f_d$=0). By implementing 1-for-N diversity coded OFDM, it is possible to reduce the energy per bit by about 10 dB and achieve similar performance than with a system that does not use diversity coded OFDM. Moreover, when the relative speed between transmitter and receiver vehicles is high, the symbol error rate per subcarrier is also high. Therefore, by adding an extra subcarrier to transmit protection data, the performance of the communication can be significantly increased. Note that when the relative speed is high, it is not possible to significantly reduce the symbol error rate by increasing the energy per bit ($E_b/N_0$).

The present invention provides a Diversity Coding-Orthogonal Frequency Division Multiplexing (DC-OFDM) scheme that applies diversity coding to OFDM-based systems and provides improved probability of successful reception at the receiver and transparent self-healing and fault-tolerance. Diversity coding is well suited for OFDM-based systems because of its spatial diversity nature (parallel links). DC-OFDM provides the best performance when the probability of link error is high or when a link (sub-channel) fails. Also, by implementing diversity coding in OFDM-based systems, a reliable communication can be provided that is quite tolerant of link failures, since data and protection lines are transmitted via multiple sub-channels. Moreover, only adding one protection line (subcarrier), DC-OFDM provides significant performance improvement. Note that DC-OFDM is also well suited for mobile communications because this type of communications has high symbol error probability. Diversity coded OFDM enables increased probability of successful reception at the receiver, thus, increasing the reliability of the communication.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for transmitting data symbols in an orthogonal frequency division multiplexing (OFDM) system, the method comprising:
   identifying a number of data subcarriers of the OFDM system and a number of protection subcarriers of the OFDM system;
   generating two or more uncoded data symbols;
   generating one or more diversity coded data symbols by performing mathematical operations on the two or more uncoded data symbols in a Galois Field, the one or more diversity coded data symbols including a combination of the one or more uncoded data symbols and the diversity coded data symbols having the same number of bits as the two or more uncoded data symbols;
   transmitting, by a transmitter, each of the two or more uncoded data symbols on the number of data subcarriers of the OFDM system; and
   transmitting, by the transmitter, each of the one or more diversity coded data symbols on the number of protection subcarriers of the OFDM system.

2. The method of claim 1, wherein the one or more diversity coded data symbols includes a checksum.

3. The method of claim 2, wherein the checksum is equal to the logical XOR function of the uncoded data symbols.

4. The method of claim 1, wherein the more number of data subcarriers is greater than the one or more number of protection subcarriers.

5. The method of claim 1, wherein the number of protection subcarriers is equal to one protection subcarrier.

6. A method for recovering lost data symbols in an orthogonal frequency division multiplexing (OFDM) system, the method comprising:
   receiving, by a receiver, two or more uncoded data symbols transmitted on a number of data subcarriers of the OFDM system and one or more diversity coded data symbols transmitted on a number of protection subcarriers of the OFDM system, the one or more diversity coded data symbols generated by performing mathematical operations on the two or more uncoded data symbols in a Galois Field, the one or more diversity coded data symbols including a combination of the two or more uncoded data symbols and the coded data symbols having the same number of bits as the two or more uncoded data symbols; and
   when one or more of the uncoded data symbols is lost during transmission, recovering the one or more lost uncoded data symbols using the one or more diversity coded data symbols.

7. The method of claim 6, wherein the one or more diversity coded data symbols includes a checksum.

8. The method of claim 7, wherein the checksum is equal to the logical XOR function of the uncoded data symbols.

9. The method of claim 6, wherein the number of data subcarriers is greater than the number of protection subcarriers.

10. The method of claim 6, wherein the number of protection subcarriers is equal to one protection subcarrier.

11. The method of claim 6, wherein recovering the one or more lost uncoded data symbols using the one or more diversity coded data symbols further comprises calculating the logical XOR of the one or more diversity coded data symbols and the one or more lost uncoded data symbols.

12. The method of claim 6, further comprising detecting that one or more uncoded data symbols has been lost during transmission.

13. The method of claim 12, wherein detecting that one or more uncoded data symbols has been lost during transmission comprises detecting that the number of errors in the one or more uncoded data symbols exceeds an error correction capability of a forward error correction code (FEC).

14. A system for recovering data in an orthogonal frequency division multiplexing (OFDM) system, the system comprising:
   a transmitter configured for identifying a number of data subcarriers of the OFDM system and a number of protection subcarriers of the OFDM system, for generating two or more uncoded data symbols, for generating one or more diversity coded data symbols, the one or more diversity coded data symbols generated by performing mathematical operations on the two or more uncoded data symbols in a Galois Field, the one or more diversity coded data symbols including a combination of the two or more uncoded data symbols and the diversity coded data symbols having the same number of bits as the two or more uncoded data symbols, for transmitting each of the one two or more uncoded data symbols on the number of data subcarriers of the OFDM system and for transmitting each of the one or more diversity coded data symbols on the number of protection subcarriers of the OFDM system; and a receiver configured for receiving the one or more diversity coded data symbols and for recovering the lost uncoded data symbols using the one or more diversity coded data symbols when one or more of the uncoded data symbols is lost during transmission.

15. The system of claim 14, wherein the one or more diversity coded data symbols includes a checksum.

16. The system of claim 15, wherein the checksum is equal to the logical XOR function of the uncoded data symbols.

17. The system of claim 14, wherein the number of data subcarriers is greater than the one or more protection subcarriers.

18. The system of claim 14, wherein the number of protection subcarriers is equal to one protection subcarrier.

19. The system of claim 14, wherein the receiver is further configured for recovering the one or more lost uncoded data symbols using the one or more diversity coded data symbols by calculating the logical XOR of the one or more diversity coded data symbols and the one or more lost uncoded data symbols.

* * * * *

UNITED STATES PATENT AND TRADEMARK OFFICE
CERTIFICATE OF CORRECTION

| | | |
|---|---|---|
| PATENT NO. | : 9,020,059 B1 | Page 1 of 1 |
| APPLICATION NO. | : 14/098173 | |
| DATED | : April 28, 2015 | |
| INVENTOR(S) | : Arrobo et al. | |

It is certified that error appears in the above-identified patent and that said Letters Patent is hereby corrected as shown below:

In the Claims

Column 10, Claim 4, Line 3 should read:

The method of claim 1, wherein the number of data

Column 10, Claim 4, Line 4 should read:

subcarriers is greater than the number of protec-

Column 10, Claim 14, Line 67 should read:

the two or more uncoded data symbols on the num-

Signed and Sealed this
Twenty-second Day of September, 2015

Michelle K. Lee
*Director of the United States Patent and Trademark Office*